United States Patent

Sudo et al.

[11] Patent Number: 5,822,775
[45] Date of Patent: Oct. 13, 1998

[54] EFFICIENT DATA PROCESSING METHOD FOR COEFFICIENT DATA IN A DIGITAL DIGNAL, PROCESSOR

[75] Inventors: Shuhei Sudo, Koufu; Makio Yamaki, Tokyo, both of Japan

[73] Assignees: Pioneer Video Corporation, Yamanashi; Pioneer Electric Corporation, Tokyo, both of Japan

[21] Appl. No.: 992,648

[22] Filed: Dec. 18, 1992

[30] Foreign Application Priority Data

Dec. 18, 1991 [JP] Japan .................................. 3-335260

[51] Int. Cl.$^6$ ................................................ G06F 12/00
[52] U.S. Cl. ................. 711/167; 364/271.7; 364/DIG. 1
[58] Field of Search ............................ 395/800, 425; 364/736, 752, 271.7, DIG. 1; 381/63, 43; 711/167

[56] References Cited

U.S. PATENT DOCUMENTS

| | | | |
|---|---|---|---|
| 4,991,169 | 2/1991 | Davis et al. | 370/77 |
| 4,991,217 | 2/1991 | Garrett et al. | 381/43 |
| 5,081,574 | 1/1992 | Larsen et al. | 395/375 |
| 5,129,094 | 7/1992 | Kiuchi | 395/800 |
| 5,142,489 | 8/1992 | Yamaki | 364/736 |
| 5,218,710 | 6/1993 | Yamaki et al. | 395/800 |

FOREIGN PATENT DOCUMENTS

A-64-72615  12/1991  Japan .

*Primary Examiner*—Alyssa H. Bowler
*Assistant Examiner*—John E. Harrity
*Attorney, Agent, or Firm*—Fish & Richardson P.C.

[57] ABSTRACT

A coefficient data transfer processing method for a digital signal processor which has a coefficient address pointer independent of a program counter, whereby a processing program and coefficient data are transferred and supplied from a microcomputer determination, whether an instruction is a read instruction of the coefficient data to execute a read cycle steal or with is made; a value of a program counter with is made; when it is the read instruction, new coefficient data is transferred from the microcomputer to a transfer buffer at an instruction read stage and instruction decode stage in a processing unit; and the coefficient data stored in the transfer buffer is written into a coefficient data memory by the read cycle steal at an execute stage in the same processing unit.

2 Claims, 2 Drawing Sheets

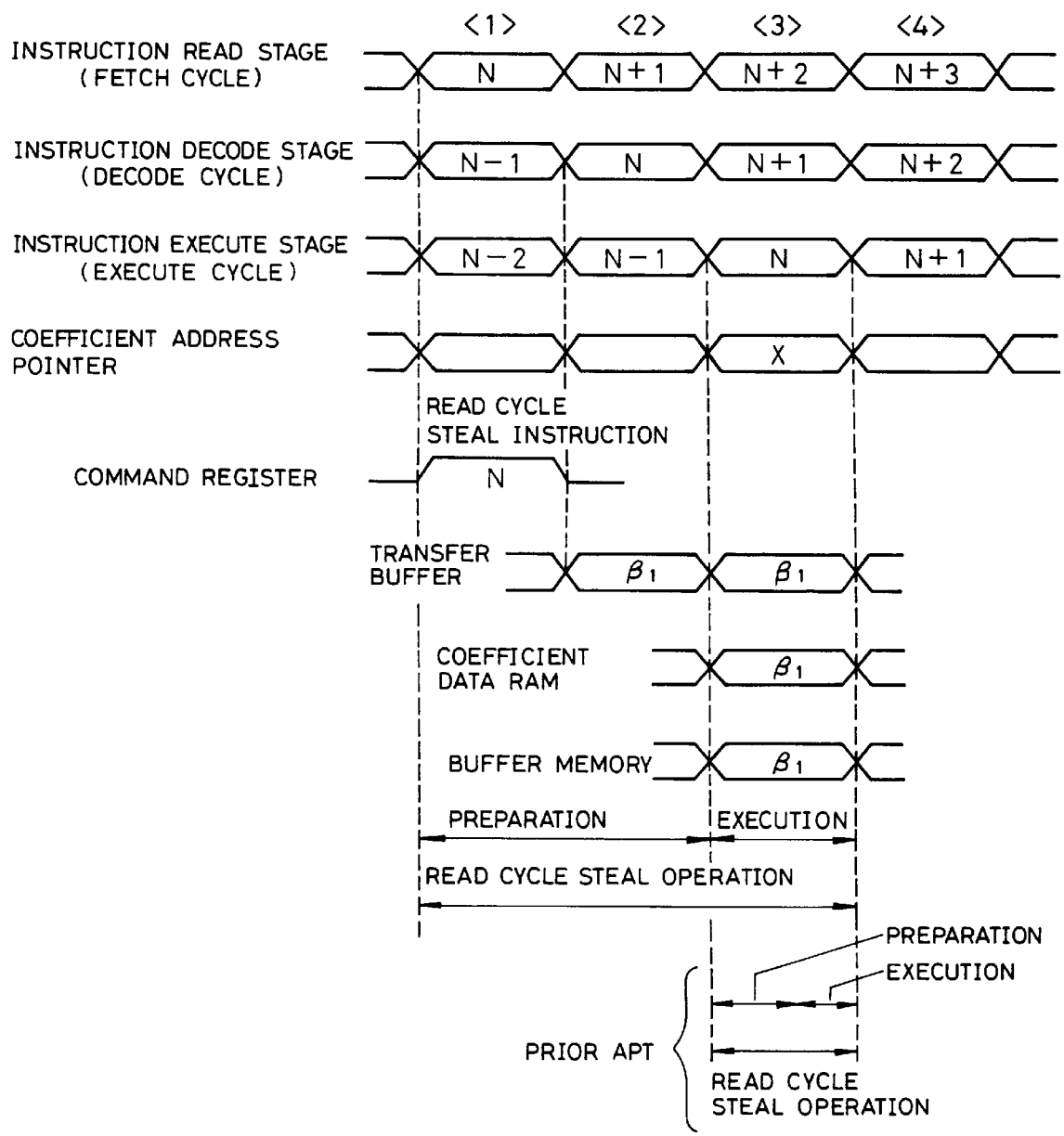

EFFICIENT DATA PROCESSING METHOD FOR COEFFICIENT DATA IN A DIGITAL DIGNAL, PROCESSOR

BACKGROUND OF THE INVENTION

1. Field of the Invention

The invention relates to a transfer processing method of coefficient data in a digital signal processor (hereinafter, referred to as a DSP) to perform an arithmetic operation on a digital signal, such as a digital audio signal, by a pipeline process.

2. Description of the Related Background Art

An audio signal processing apparatus which can control the sound field of a reproduced sound in order to produce an acoustic space similar to a concert hall or theater, for instance, the reverberation sound or presence in a room or vehicle (refer to JP-A-64-72615), is well-known. Such an audio signal processing apparatus has a DSP for performing a digital arithmetic operating process to an audio signal supplied by an audio signal source, such as a tuner, and executes the desired sound field control.

The DSP has an arithmetic operating section to execute arithmetic operating processes, such as four arithmetical operations and memories such as signal data RAM to store digital audio signal data which is supplied to the arithmetic operating section, coefficient data RAM to store coefficient data which is multiplied to the audio signal data, and the like. By transferring the signal data between the memories and from each memory to the arithmetic operating section in accordance with a predetermined processing program, a desired arithmetic operation, such as the product sum arithmetic operation ($\Sigma a_i \cdot d_i$), is executed at high speed.

A program for an arithmetic operating process which is used in the DSP is stored in a rewritable program RAM in the DSP. Each time the sound field mode or the like is switched, the corresponding processing program and coefficient data are transferred from a microcomputer and are written to the rewritable program RAM, so that the desired acoustic space sound can be produced.

The execution of one program instruction in the DSP is, generally, constructed in a manner so that three cycles of an instruction reading stage (fetch cycle) to read an instruction code from the designated address position, an instruction decoding stage (decode cycle) to decode the read-out instruction code, and an instruction executing stage (execute cycle) to execute the decoded instruction code are set in a processing unit and those instructions are sequentially executed by a pipeline processing method.

In an audio signal processing apparatus, on the other hand, for instance, the processes of changing filter characteristics to change the quality of a reproduced sound is often performed. To change the filter characteristics as mentioned above, new coefficient data which matches the filter characteristics after change in sound quality is made is transferred from a microcomputer to the DSP and written. A filter arithmetic operation must then be executed based on the new coefficient data.

When writing the coefficient data, it is necessary to write the coefficient data into new values while continuing the arithmetic operation in order not to cause an inconvenience, such as stopping the arithmetic operation currently being executed and breaking the reproduction sound of the audio signal. To write the coefficient data as mentioned above, a method called a read cycle steal has been used.

That is, according to the read cycle steal, when coefficient data which needs to be written is read out from the coefficient data RAM, the operating mode of the coefficient data RAM is switched from the reading mode to the writing mode. New coefficient data is transferred and written to the relevant address position and is also transferred to the arithmetic operating section. Thus, the target coefficient data is updated without stopping the arithmetic operation in the arithmetic operating section.

OBJECTS AND SUMMARY OF THE INVENTION

In the conventional read cycle steal mentioned above, however, all of the processes such as discrimination of the address in the coefficient RAM data, transfer of the new coefficient data from the microcomputer to the DSP, switching of the reading/writing modes, writing of the coefficient data into the coefficient data RAM, transfer of the coefficient data to the arithmetic operating section must be executed by the execution stage in the processing cycle of the read instruction of the coefficient data; the DSP having a high processing speed must be used to perform these processes.

The invention is made on the basis of the above circumstances. It is an object of the invention to provide a coefficient data change processing method for a DSP which can provide a surplus time in execution of a rewriting process of coefficient data in the read cycle steal, and doesn't need a high speed operation.

To accomplish the above object, according to the present invention, a coefficient data change processing method of a DSP for a pipeline system which has a coefficient address pointer independent of a program counter and transfers and supplies a processing program or coefficient data from a microcomputer for control, wherein a check is made to see if an instruction is a read instruction of the coefficient data to execute a read cycle steal or a value of the program counter, and in the case where it is a read instruction, new coefficient data in an instruction read stage and an instruction decode stage of a processing unit is transferred from the microcomputer to a transfer buffer, and the coefficient data stored in the transfer buffer is written into a coefficient data memory by the read cycle steal in the execution stage in the processing unit.

A processing program which is used in the DSP has been stored in the microcomputer and all of the contents of the processor are known. If the address of the instruction to be executed is known, the content of the instruction can be also previously known. That is, whether an instruction is a read instruction of the coefficient data to execute the read cycle steal or not can be preliminarily judged from the value of the program counter which designates the address of the instruction to be executed.

The present invention uses an unconditional correspondence relation between the value of the program counter and the instruction which is executed. In accordance with the value of the program counter, a check is made to see if the address indicates the read instruction of the coefficient data RAM to execute the read cycle steal or not. In case of the relevant read instruction, in the instruction read stage and instruction decode stage in a processing unit of the read instruction of the relevant coefficient data, the coefficient data is transferred from the microcomputer to the DSP and the preparing operation to execute the read cycle steal are started. In the instruction execute stage, accordingly, it is sufficient that the new coefficient data to be rewritten is merely written to the relevant address position in the coefficient data RAM.

BRIEF DESCRIPTION OF THE DRAWINGS

FIG. 2 is an operationally explanatory diagram of the present invention in the embodiment of FIG. 1.

DETAILED DESCRIPTION OF THE EMBODIMENT

Figure 1:
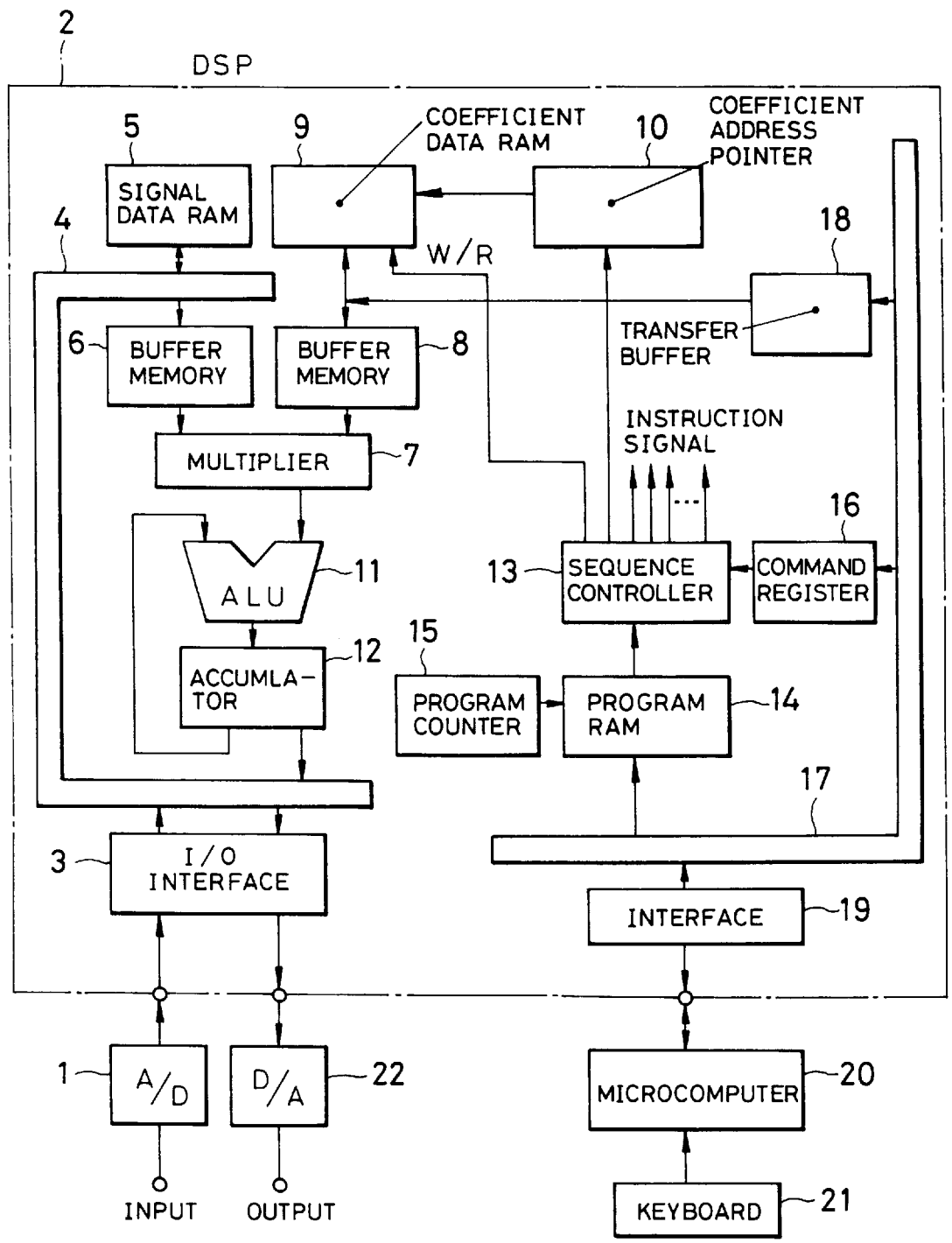
FIG. 1 is a diagram showing an embodiment of a DSP which is constructed by applying the method of the present invention.

An embodiment of the invention will be described hereinbelow with reference to the drawings.

FIG. 1 shows an embodiment of a DSP according to the present invention. In the diagram, an analog audio signal is supplied through an A/D converter 1 to an input/output interface (I/O interface) 3 in a DSP 2. A data bus 4 is connected to the I/O interface 3. A signal data RAM 5 to store audio signal data is connected to the data bus 4.

A buffer memory 6 to hold signal data which is sent from the signal data RAM 5 is connected to the data bus 4. An output of the buffer memory 6 is connected to one input of a multiplier 7. A buffer memory 8 to hold coefficient data is connected to the other input of the multiplier 7. A coefficient data RAM 9 to store the coefficient data is connected to the buffer memory 8. A coefficient address pointer 10 to designate read/write addresses is provided for the coefficient data RAM 9.

An ALU (arithmetic logic unit) 11 executes an arithmetic operation such as accumulation of a calculation output of the multiplier 7. The calculation output of the multiplier 7 is supplied to one input of the ALU 11. An output of an accumulator 12 to hold the calculation output of the ALU 11 is supplied to the other input. The output of the accumulator 12 is supplied to the data bus 4.

A program RAM 14 is connected to a sequence controller 13 to control the operation of the DSP. A predetermined instruction signal is given to a predetermined circuit at a predetermined time in accordance with a processing program written in the program RAM 14. Each time the count value of program counter 15 is increased, an instruction code from the address corresponding to the new count value is read from the program RAM 14 and supplied to the sequence controller 13. A command register 16 which holds commands from microcomputer 20, which will be explained hereinbelow, is connected to sequence controller 13.

The program RAM 14 and the command register 16 are connected to a main bus 17. A transfer buffer 18 which temporarily holds coefficient data transferred to the coefficient data RAM 9 from the microcomputer 20, (which will be explained later) is connected to the main bus 17. The microcomputer 20 is connected to the main bus 17 through an interface 19.

The microcomputer 20 includes a CPU, an RAM, and an ROM (all of them are not shown). In addition to the control program for the microcomputer itself, various processing program groups which are used in the DSP 2, a plurality of coefficient data groups which are used in the processing programs, and the like, have been stored in the ROM of the microcomputer 20.

A keyboard 21 is connected to the microcomputer 20. Control keys of sound fields, such as hall 1 and hall 2, are prepared on the keyboard 21. The microcomputer 20 reads out the processing program corresponding to the operated sound field control key, the coefficient data group used in a particular program, and the like, from the ROM, and transfers this data to the DSP 2 through the interface 19. On the other hand, the audio signal data, after it has been arithmetically operated on by the DSP 2, is supplied to a D/A converter 22 through the data bus 4. It I/O interface 3 and is then converted into an analog signal. Then, the analog signal is supplied to a circuit or apparatus at the post stage.

In the embodiment with the above construction, the operation of the whole DSP will be first described.

When any key on the keyboard 21 is selected, the microcomputer 20 reads out the processing program corresponding to the selected key from the ROM (not shown), transfers the program through the interface 19 and main bus 17, and stores it in program RAM 14. A group of coefficient data, $\alpha_1$, $\alpha_2$, ..., $\alpha_n$, which are used in the processing program, are read out from the ROM and transferred and stored in the coefficient data RAM 9 through the interface 19, main bus 17, and transfer buffer 18.

When the processing program and the coefficient data group are set into the DSP 2 as mentioned above, a predetermined arithmetic operating process is applied to the input audio signal. That is, the audio signal which is sent from the A/D converter 1 is first sequentially sampled at a predetermined sampling period and then converted into audio signal data, $d_1, d_2, \ldots, d_n$. The sampled audio signal data, $d_1, d_2, \ldots, d_n$, are supplied to the data bus 4 through the I/O interface 3 and written into the signal data RAM 5.

First, the first signal data, $d_1$, is read from the signal data RAM 5 and held in the buffer memory 6. The first coefficient data $\alpha_1$ is read from the coefficient data RAM 9 and held into the buffer memory 8. The multiplier 7 multiplies $\alpha_1$ and $d_1$ and then the ALU 11 adds the initial value 0 of the accumulator 12 to the multiplication value $\alpha_1 \cdot d_1$. Then, the addition value, $\alpha_1 \cdot d_1$, is held in the accumulator 12.

Subsequently, the second signal data $d_2$ is read and then held in the buffer memory 6, and the second coefficient data $\alpha_2$ is read and then held in the buffer memory 8. The multiplier 7 multiplies $\alpha_2$ and $d_2$. The addition value, $\alpha_1 \cdot d_1$, held in the accumulator 12, is added to the multiplication value, $\alpha_2 \cdot d_2$, by the ALU 11. After that, the addition value $(\alpha_1 \cdot d_1 + \alpha_2 \cdot d_2)$ is again held in the accumulator 12. By repeatedly executing this product sum operation ($\Sigma \alpha_i \cdot d_i$), a filtering process of, for example, desired frequency characteristics is applied to the input audio signal to produce audio signal data.

The audio signal data derived by the product sum operating process is stored in the signal data RAM 5 through the accumulator 12 and data bus 4. Then, the audio signal data is transferred to the I/O interface 22 through the data bus 4 at a predetermined time and converted into an analog signal, and output.

The read cycle steal operation according to the present invention will now be described with reference to FIG. 2. The group of coefficient data $\alpha_i$ (i=1, 2, ..., n) has already been stored in the coefficient data RAM 9. The processing program to execute the product sum operation ($\Sigma \alpha_i \cdot d_i$) using the coefficient data group $\alpha_i$ has been stored in the program RAM 14.

When a change command for the filter characteristics is given from the keyboard 21 during execution of the product sum operation, the microcomputer 20 searches for the new coefficient data group which corresponds to the changed filter characteristics in the ROM. It is assumed that the new coefficient data group is set to $\beta_i$ (i=1, 2, ..., n). It is also assumed that the coefficient data is rewritten for example, such that $\alpha_i$ replaces $B_i$, $(\alpha_1 \rightarrow \beta_1), (\alpha_2 \rightarrow \beta_2), \ldots, (\alpha_i \rightarrow \beta_i)$, by the read cycle steal. Further, it is also assumed that the instruction to read the coefficient data $\alpha_1$ from the coefficient data RAM 9 and transfer the data to the buffer memory 8 has been indicated in an address N in the program RAM 14.

When receiving the change command for the filter characteristics, the microcomputer 20 sends a command "Execute the read cycle steal in the instruction of address N" to the command register 16 through the interface 19 and main bus 17. Based on the read cycle steal instruction, the system controller 13 rewrites the coefficient data in an address X of the coefficient data RAM 9 from $\alpha_1$ to $\beta_1$ as shown in FIG. 2.

The pipeline process in FIG. 2 will be first briefly explained. The cycles <1> to <3> in FIG. 2 are set to a processing unit to one read instruction.

At the instruction read stage of the cycle <1> in FIG. 2, it is assumed that the program counter 15 of the DSP 2 indicates the address N. In other words, the program address in which the instruction code to read out the coefficient data $\alpha_1$ is indicated, the sequence controller 13 starts the read operation of the instruction code in address N of program RAM 14 at the instruction read stage in cycle <1>. In the instruction decode stage in cycle <2>, the instruction code of the address N which has been read out is decoded. On the other hand, when the processing routine advances to cycle <2>, the reading of the instruction code of the next address, N+1, is started at the instruction read stage which is in the cycle <2>.

When the processing routine further advances to cycle <3>, the instruction in address N is executed at the instruction execute stage. The instruction code of the address N+1 is decoded at the instruction decode stage, and, the instruction code of the address N+2 is read out at the instruction read stage. Each processing command is sequentially processed by the pipeline processing method, as described above.

In cycle <1> in FIG. 2, when the program counter 15 indicates address N of the processing program, the sequence controller 13 starts reading of the instruction code of address N in the program RAM 14. At the same time, based on the read cycle steal instruction stored in command register 16, the sequence controller 13 checks whether address N of the relevant program is the address in which the read cycle steal should be executed or not.

When address N coincides with the address to execute the read cycle steal, instruction the sequence controller 13 initiates a transfer request of the coefficient data $\beta_1$ to perform the read cycle steal to the microcomputer 20 in cycle <2>. The microcomputer 20 reads coefficient data $\beta_1$ from the ROM in accordance with the transfer request and transfers it to the transfer buffer 18 through the interface 19 and main bus 17.

At the instruction execute stage which is in cycle <3>, the coefficient address pointer 10 is set into the address X and the reading operation of the coefficient data $\alpha_1$ of the address X is started. As mentioned above, however, since the read cycle steal instruction has been generated for the read instruction of the program address N, the sequence controller 13 switches the coefficient data RAM 9 from a reading mode R to a writing mode W.

When the operating mode of the coefficient data RAM 9 is switched to the writing mode, new coefficient data $\beta_1$ is transferred from the transfer buffer 18 and stored at address X, as designated by the coefficient address pointer 10. At the same time, coefficient data $\beta_1$ of transfer buffer 18 is also sent to buffer memory 8. By using the new coefficient data $\beta_1$ sent to the buffer memory 8, the multiplication $\beta_1 \cdot d_1$ with the signal data $d_1$ held in the buffer memory 6 is executed.

The transfer process of coefficient data by the read cycle steal described above is sequentially executed with respect to each of the coefficient data $\alpha_i$ (i=1, 2, . . . , n). Thus, coefficient data $\alpha_i$ can be replaced new coefficient data $\beta_1$ while executing the product sum operation ($\Sigma \beta_i \cdot d_i$) using the new coefficient data $\beta_i$ in the arithmetic operating section. Moreover, as will be also obviously understood from FIG. 2, at the instruction read stage of cycle <1> and the instruction decode stage of cycle <2>, all of the preparing operations for the read cycle steal, such as determining whether the position is the instruction address position at which the read cycle steal should be executed or not, and transferring coefficient data $\beta_i$ from the microcomputer to the DSP, can be executed.

At the instruction execute stage of cycle <3>, therefore, it is sufficient to execute only the transfer of coefficient data $\beta_1$ to coefficient data RAM 9; a high speed operation is unnecessary. When rewriting the coefficient data by the conventional read cycle steal, as shown in the lower portion in FIG. 2, all of the foregoing processing operations must be executed at a high speed at the instruction execute stage in cycle <3>.

Although the above embodiment has been described with respect to the case of sequentially transferring the coefficient data, $\beta_i$, one by one to the transfer buffer 18 for each rewriting process, it is also possible to use a large memory as a transfer buffer 18 and to transfer the coefficient data group $\beta_i$ to the transfer buffer 18 all together when the first read cycle steal instruction is executed.

As will be obviously understood from the above explanation, according to the coefficient data change processing method of the present invention, a check is made to determine whether the instruction is the read instruction of the coefficient data indicating execution of the read cycle steal from or the value of the program counter. When the instruction is the read instruction, the new coefficient data is transferred from the microcomputer to the transfer buffer at the instruction read stage and instruction decode stage of the processing unit. The coefficient data stored in the transfer buffer is written into the coefficient data memory by the read cycle steal at the execute stage of the processing unit. There is, accordingly, sufficient time to execute the rewriting process of the coefficient data upon read cycle steal and the high speed operation can be made unnecessary. The transfer process of the coefficient data can, therefore, be realized through a less expensive DSP.

What is claimed is:

1. A coefficient data change processing method for a digital signal processor of a pipeline system which has a coefficient address pointer independent of a program counter, and transfers and supplies a processing program and coefficient data from a microcomputer, said method comprising the steps of:

discriminating whether an instruction is a read instruction of said coefficient data at which a read cycle steal should be executed from a value of said program counter;

when said instruction is a read instruction, transferring new coefficient data during an instruction read stage and an instruction decode stage in a processing unit to a transfer buffer from said microcomputer; and writing said coefficient data stored in said transfer buffer into a coefficient data memory by said read cycle steal at an execution stage in said processing unit.

2. A method according to claim 1, wherein at said execution stage, said coefficient data stored in said transfer buffer is also written into a buffer memory for multiplication with signal data.

* * * * *